US006308181B1

(12) United States Patent
Jarvis (10) Patent No.: US 6,308,181 B1
(45) Date of Patent: Oct. 23, 2001

(54) ACCESS CONTROL WITH DELAYED BINDING OF OBJECT IDENTIFIERS

(75) Inventor: Brian L Jarvis, Orem, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/216,254

(22) Filed: Dec. 19, 1998

(51) Int. Cl.$^7$ ................................................. G06F 17/30
(52) U.S. Cl. ............................................................. 707/102
(58) Field of Search ................................................ 707/102

(56) References Cited

U.S. PATENT DOCUMENTS

| | | | |
|---|---|---|---|
| 4,442,484 | * 4/1984 | Childs, Jr. et al. | 711/163 |
| 5,315,657 | 5/1994 | Abadi et al. | 380/25 |
| 5,432,934 | 7/1995 | Levin et al. | 395/650 |
| 5,437,025 | 7/1995 | Bale et al. | 395/600 |
| 5,485,617 | * 1/1996 | Stutz et al. | 709/303 |
| 5,608,903 | 3/1997 | Prasad et al. | 395/610 |
| 5,664,170 | 9/1997 | Taylor | 395/200.5 |
| 5,677,851 | 10/1997 | Kingdon et al. | 364/514 C |
| 5,701,458 | 12/1997 | Bsaibes et al. | 395/609 |
| 5,758,344 | 5/1998 | Prasad et al. | 707/10 |
| 5,761,669 | * 6/1998 | Montague et al. | 707/103 |
| 5,784,560 | 7/1998 | Kingdon do et al. | 395/200.31 |
| 5,794,232 | 8/1998 | Mahlum et al. | 707/3 |
| 5,878,415 | * 3/1999 | Olds | 707/9 |
| 5,913,025 | * 6/1999 | Higley et al. | 707/9 |
| 5,999,911 | * 12/1999 | Berg et al. | 705/9 |
| 6,055,527 | * 4/2000 | Badger et al. | 707/2 |
| 6,061,740 | * 5/2000 | Ferguson et al. | 709/246 |
| 6,158,007 | * 12/2000 | Moreh et al. | 713/201 |
| B1 6,181,336 | * 1/2001 | Chiu et al. | 345/329 |
| B1 6,192,405 | * 2/2001 | Bunnell | 709/506 |

OTHER PUBLICATIONS

Serial No. 08/821,087 filed Mar.20, 1997.
Andrew S. Tanenbaum, "Distributed Operating Systems", (1995), pp. 520–527, 544–563.
C. J. Date, "An Introduction to Database Systems", (1995), 686–709.
"JavaServer Product Group—Access Control Lists", (no later than May 21, 1998), pp.1–4.
Doug Bierer et al., NetWare 4 for Professionals, (1993), pp. 389–406, 470–475, 755–764, 770–793.
Werner Feibel, Novell's® Complete Encyclopedia of Networking, (1995), pp. 12, 13, 239–241, 317, 488, 625–630.

* cited by examiner

Primary Examiner—Wayne Amsbury
(74) Attorney, Agent, or Firm—Haynes and Boone, LLP (57) ABSTRACT

Methods, signals, devices, and systems are provided for controlling access to objects and their attributes in a database. The database may be hierarchical, or it may have positional relationships based on a graph structure. In a hierarchical database possible positional relationships include "child", "parent", "grandchild", and so on. A trustee field in an access control property of a target object is furnished with the positional relationship. A positional relationship is evaluated when an access request is made, and the binding of trustee object identifiers with particular targets through access control properties is thereby delayed until such binding is necessary to determine if the access request should be granted. The delayed binding may be combined with inheritance, with conventional access control lists, and with other familiar tools and techniques to enhance access control in the database of objects.

35 Claims, 7 Drawing Sheets

(PRIOR ART)

(PRIOR ART)

FIG. 7

(PRIOR ART)

ACCESS CONTROL WITH DELAYED BINDING OF OBJECT IDENTIFIERS

FIELD OF THE INVENTION

The present invention relates to tools for controlling access to objects in a database, and relates more particularly to controlling access by using a positional relationship and delayed identifier binding to specify a trustee object that receives access to a target object.

TECHNICAL BACKGROUND OF THE INVENTION

Complex database systems are increasingly important in many aspects of daily life. Such databases contain growing amounts of private or trade secret information. Confidential information such as medical records, bank records, brokerage account records, legal documents, product plans, and prices, for instance are stored in or accessed through various types of databases. Such information should only be viewed and/or modified by appropriate people. Accordingly, it would be helpful to make database security controls relatively easy to implement accurately.

Databases are sometimes used in complex computer networks by directory service providers. Directory services are sometimes called "naming services". Directory service databases that are hierarchical are known as "directory service databases" or "directory service repositories".

Directory service databases are built using a set of rules, called a "schema", which describe the various types of objects in the database and the possible relationships between objects and attributes. The objects are grouped into object classes according to object type. Specific object classes might include "printer", "server", and "user". The object classes have attributes associated with them. Typical attributes for the user class are "group membership", "account balance" and "telephone number". Finally, objects also have attributes. These attributes are individual instantiations of the class attributes, such as a specific account balance or telephone number.

In some hierarchical databases, objects may also be grouped in containers. A particular container object serves as the root of a particular subtree. One use of subtrees is to control access to objects in the database, as discussed below.

Databases use various approaches to control access to objects and attributes, including access control lists, inherited rights filters, and security equivalences. Commonly owned application Ser. No. 08/821,087 filed Mar. 20, 1997 and entitled "Controlling Access to Objects in a Hierarchical Database" ("the '087 application"), now U.S. Pat. No. 5,878,415 discusses an invention which provides inheritable access constraints such as object class filters and inheritance constraints on specific object properties. The '087 application is herein incorporated by reference. Access control is also discussed at pages 389–401 of *NetWare 4 for Professionals,* ISBN 1-56205-217-9 ("NetWare 4"), incorporated herein. The terms "attribute" and "property" are used interchangeably in NetWare 4 and herein, as are the terms "attribute syntax" and "property syntax". For convenience, aspects of those discussions of access control tools are repeated here.

An access control list ("ACL") is an optional property of every object class. In some implementations, every object in the database can have an ACL. Multiple ACLs may exist on a single object, and there is no limit (other than space and efficiency considerations) on the number of ACLs per object.

The ACLs of a target object identify specific trustees, namely, objects that are given rights to access the target object and/or properties of the target object. In short, each ACL on a target object normally grants at least one access right to at least one trustee whose identity is specified in the ACL.

In some implementations, each ACL has three parts. The first part identifies the trustee object receiving the access rights. This is done by an object ID, GUID, tuned name, distinguished name, or other object identifier which presently identifies a particular object. In some cases, the position normally occupied by the object ID holds instead a special value which indicates that an inherited rights filter is present.

The second part of the ACL identifies a property type, thereby indicating the property or properties for which the access rights are being given. Property types might include "object rights", "all properties rights", and specific properties, for instance. This part of the ACL indicates the level at which the right is being granted. For instance, "object rights" indicates rights are being granted to the object itself, while "all properties rights" indicates rights are being granted to the properties of the object. Inherited rights filters and inheritance of specific properties are discussed in the '087 application; that discussion is incorporated here by reference.

The third part of the ACL identifies at least one access right that is given to the trustee object for properties of the indicated property type. For "object rights", possible access rights might include rights to browse, create, delete, rename, or supervise. For "all properties rights", possible access rights could include rights to compare, read, write, add or delete self, or supervise.

In some systems, rights granted to "object rights" or "all properties rights" may be inherited. For instance, rights granted at a container may also apply to all objects in the subtree of which the container is the root.

It is often desirable to grant rights suitable for administration of particular resources. For instance, a printer administrator would need rights to add, delete, and modify printer objects in a subtree. A telephone number administrator would need rights to modify telephone numbers or user objects. A password administrator would need rights to change a user's password when the user forgets the original password. And, a personnel administrator would need rights to create, modify, delete, and move user objects to reflect personnel changes. Most (or all) users need to be granted access to modify their own files, and change their own personal information, such as their telephone numbers and their addresses. It is desirable to grant these specialized administration rights in a way that is compatible with existing access control mechanisms, so that the database is not taken out of service during a long and painful conversion process.

One conventional approach is to give each of these specialized administrators supervisor rights to the appropriate subtree(s). Unfortunately, this often gives specialized administrators more rights than are strictly necessary. Furthermore it cannot be practically used when giving individual rights to users. Granting excess rights may lead at best to inconsistent attempts to change the database, as when a user changes a phone number and an administrator inadvertently loses the update by restoring data from an old backup. At worst, excess rights may lead to a security breach which compromises the secrecy and the integrity of information in the database.

Another approach is to place an appropriate ACL on each administered object. However, rather than easing administration, this creates significant maintenance burdens. The number of objects involved is often large, and updating the ACLs in a large subtree can be time-consuming, tedious, and error-prone.

Thus, it would be an advancement in the art to provide improved ways to efficiently grant limited rights to specialized administrators and users in a database.

It would be an additional advancement to provide improvements which extend the capabilities of existing access control mechanisms, and hence can be used in conjunction with existing mechanisms.

Such improvements are disclosed and claimed herein.

BRIEF SUMMARY OF THE INVENTION

The present invention provides improved tools for controlling access to objects in a database. In one embodiment, a computer-implemented method begins by choosing at least one target object in the database and then choosing a positional relationship which will be interpreted in reference to the target object. In a hierarchical database possible positional relationships include "child", "parent", "grandchild", and so on.

A trustee field in an access control property of the target object is then furnished with the positional relationship. An access control property resembles an ACL but allows delayed binding of trustee object identifiers. Rather than identifying a trustee object with a GUID or other conventional identifier, the access control property specifies a positional relationship and the actual identity of the object presently in that relationship with the target object is determined when access to the target object is requested, not when the access control property is written.

That is, when a requesting object asks permission to access the target object, the positional relationship in the target object's access control property is evaluated. If the requesting object is in the positional relationship indicated and if the access rights requested are allowed, then access is granted. For example, suppose the requesting object is OBJ1, the target object is OBJ1, and the access control property contains "self". The positional relationship between requester OBJ1 and target OBJ1 will be determined to be "self", and this requester-target relationship will compare favorably with the required relationship "self" in the access control property. Since the requesting object is a trustee, the requested access will be given if the rights granted by the access control property encompass the kind of access requested.

More generally, access will not be granted if a requesting object is not in the positional relationship indicated or the access rights requested are not allowed. In other words, once the positional relationship is evaluated and a trustee object identifier has been bound to the trustee field, the access control property behaves like a conventional ACL.

In some embodiments that use a hierarchical database, the access control property also includes an inheritable access constraint which allows access control properties to be inherited. This allows propagation of a single access control property, with both the trustee field and the inheritable access constraint, from a subtree root to one or more target objects in the subtree. Since the trustee field holds a positional relation, it will be interpreted differently at access request time for each target object, depending on the individual target object's location in the subtree. For instance, each inherited access control property trustee field specifying "parent" will be bound to a different trustee object unless the two target objects in question have the same parent object in the subtree.

In short, the present invention provides improved tools and techniques for efficiently controlling access to data in a database of objects. The database may be hierarchical, or it may involve other positional relationships, such as those found in a directed or undirected graph. The invention extends the capabilities of existing access control tools by providing delayed binding of object identifiers. Other features and advantages of the invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention relates to methods, systems, signals, and devices for controlling access to information in an object database which is stored on, or is accessible through, a computer network or other computer system. Various components of the invention are discussed in turn below.

Databases, Computers, and Networks Generally

Suitable databases for adaptation according to the invention include those presently configured to use ACLs or compatible with ACLs, such as many directory service databases generally, Novell Directory Service databases in particular, and other databases (hierarchical or otherwise positionally structured) having components such as containers, leaves, objects, and/or attributes to which access is controlled by ACLs or other associations between a target object, a trustee object, and access rights.

Computer networks which may be configured according to the invention include, by way of example, local networks, wide area networks, and/or the Internet. "Internet" as used herein includes variations such as a private Internet, a secure Internet, a value-added network, a virtual private network, or an intranet. The computers connected by the network may be workstations, laptop computers, disconnectable mobile computers, file servers, or a combination thereof The network may include one or more LANs, wide-area networks, Internet servers and clients, intranet servers and clients, or a combination thereof.

Figure 1:
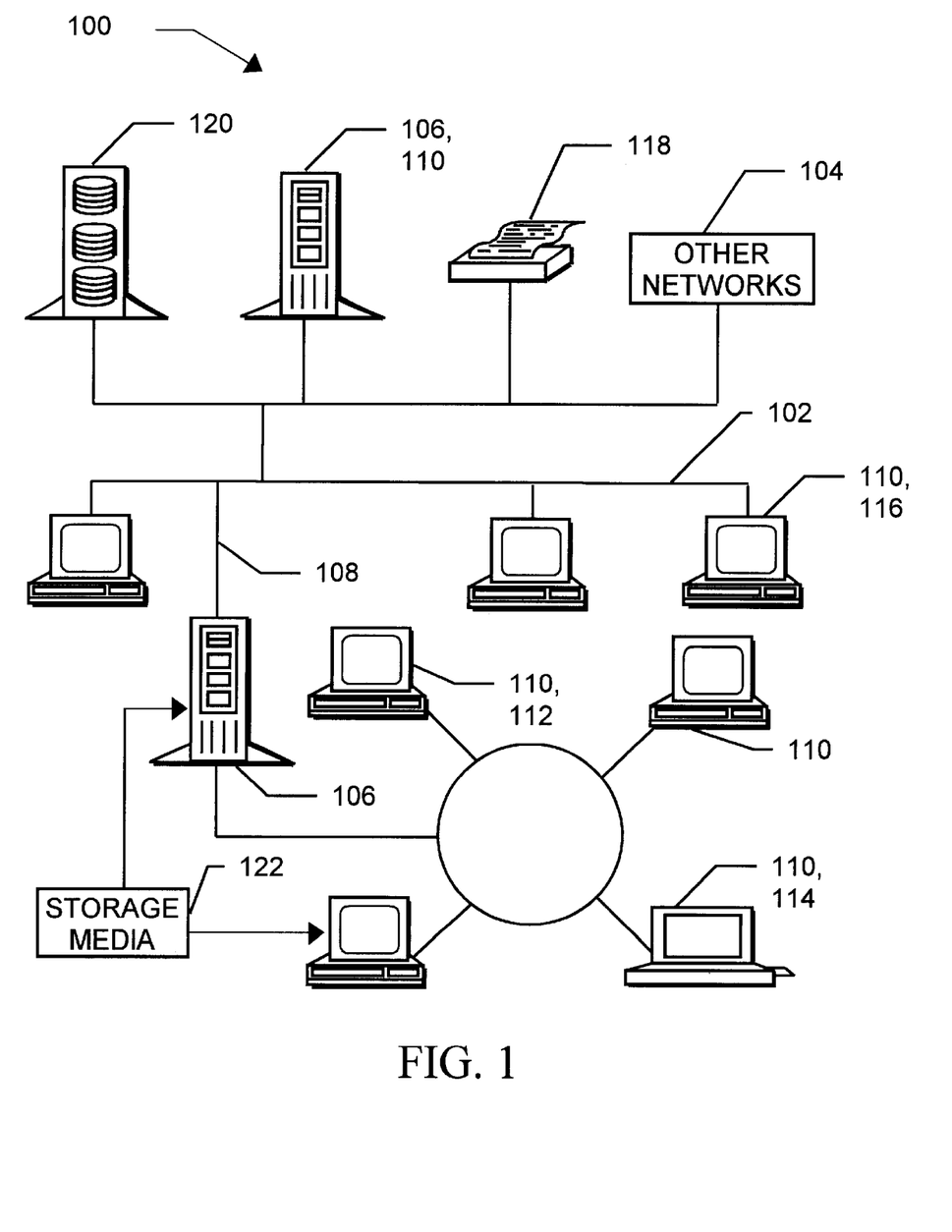
FIG. 1 is a diagram illustrating one of the many distributed computing systems suitable for use according to the present invention.

One of the many computer networked hierarchical database systems suited for use with the present invention is indicated generally at 100 in FIG. 1. In one embodiment, the system 100 includes Novell Netware® network operating system software (NETWARE is a registered trademark of Novell, Inc.). In alternative embodiments, the system 100 includes NetWare Connect Services, VINES, Windows NT, Windows 95, LAN Manager, or LANtastic network operating system software and/or an implementation of a distributed hierarchical partitioned object database according to the X.500 protocol (VINES is a trademark of Banyan Systems; NT, WINDOWS 95, and LAN MANAGER are trademarks of Microsoft Corporation; LANTASTIC is a trademark of Artisoft). The system 100 may include a local area network 102 which is connectable to other networks 104, including other LANs or portions o the Internet or an intranet, through a gateway or similar mechanism.

The system 100 includes several file servers 106 that are connected by network signal lines 108 to one or more network clients 110. The file servers 106 and network clients 110 may be configured by those of skill in the art in a wide variety of ways to operate according to the present invention. The file servers 106 may be configured as Internet servers, as intranet servers, as directory service providers or name servers, as software component servers, or as a combination thereof The servers 106 may be uniprocessor or multiprocessor machines. The servers 106 and clients 110 each include an addressable storage medium such as random access memory and/or a non-volatile storage medium such as a magnetic or optical disk.

Suitable network clients 110 include, without limitation, personal computers 112, laptops 114, workstations 116, and dumb terminals. The signal lines 108 may include twisted pair, coaxial, or optical fiber cables, telephone lines, satellites, microwave relays, modulated AC power lines, and other data transmission "wires" known to those of skill in the art. Signals according to the invention may be embodied in such "wires" and/or in the addressable storage media.

In addition to the network client computers 110, a printer 118 and an array of disks 120 are also attached to the particular system 100 shown. A given computer may function both as a client 110 and a server 106; this may occur, for instance, on computers running Microsoft Windows NT software. Although particular individual and network computer systems and components are shown, those of skill in the art will appreciate that the present invention also works with a variety of other networks and computers.

The file servers 106 and the network clients 110 are capable of using floppy drives, tape drives, optical drives or other means to read a storage medium 122. A suitable storage medium 122 includes a magnetic, optical, or other computer-readable storage device having a specific physical substrate configuration. Suitable storage devices include floppy disks, hard disks, tape, CD-ROMs, PROMs, RAM and other computer system storage devices. The substrate configuration represents data and instructions which cause the computer system to operate in a specific and predefined manner as described herein. Thus, the medium 122 tangibly embodies a program, functions, and/or instructions that are executable by the file servers 106 and/or network client computers 1 10 to perform information object access control steps of the present invention substantially as described herein.

Security Terminology

In some security terminology a "subject" is granted "rights" to act upon an "object". For example, a user (the subject) may be granted read rights to act upon (read) a file (the object). In the present discussion, by contrast, a "trustee" is granted "rights" to act upon a "target". The trustee and the target are both objects. An object which requests access is a "requesting object" or "requester", regardless of whether the rights are granted; the rights will .only be granted if the requester is also a trustee.

Some "rights" may be referred to here or elsewhere as "privileges" or "permissions" or "authorities", but subtle distinctions between these terms are not critical to an understanding of the present invention, so privileges, permissions, rights, and similar access control definitions are referred to collectively here as "rights".

The word "object" has many meanings in computer science. As used here, an "object" is a database component capable of playing the part of a target, trustee, or requester according to the invention. Objects may be found in hierarchical databases or in databases that are organized in other positional structures such as general graphs, rings, and partially or totally ordered graphs, for instance. Some relational databases do not include objects in positional relationships and thus are not within the scope of the invention. However, to the extent that a hybrid relational-and-object-oriented database incorporates objects, positional relationships, and/or access control through ACLs or the like, the hybrid system may also benefit from the present invention by including delayed binding and other claimed features. In particular, objects in a database suited to the invention may include tables which define database relations.

An "access control property" is a property, attribute, field, set of fields, or other association between a target object, a specification of one or more rights, and at least one potential or actual trustee object. The access control property may associate one or more potential trustees by specifying the positional relationship the trustee(s) must have with the target, or the property may associate one or more actual trustees by binding them through their IDs—to the property.

Positional Relationships

Figure 2:
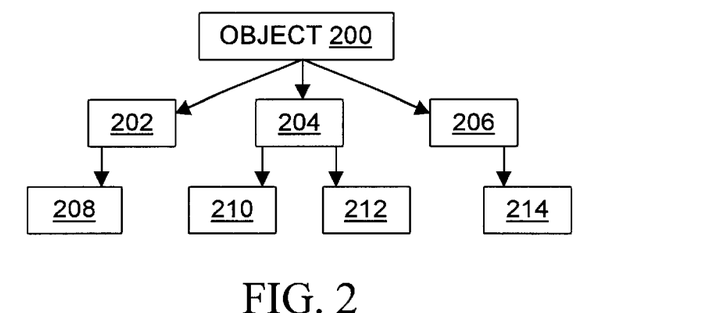
FIG. 2 is a diagram illustrating part of a hierarchical database of objects stored in a system such as the system shown in FIG. 1.

FIG. 2 illustrates hierarchical positional relationships. This hierarchy is organized much like a family tree, with familiar relationships such as "parent", "child", "grandparent", "sibling", and so forth. In this example, object 200 is the root of the tree, and is the parent of objects 202, 204, and 206. Object 200 is the grandparent of objects 208 through 214. Object 214 is a child of object 206. Objects 202 through 214 are descendants of object 200, while objects 204 and 200 are ancestors of object 210. Each of these relationships (grandparent, child, ancestor, descendant) and others, which are readily recognized by those skilled in the art, are positional relations.

A database need not be hierarchical to have positional relationships. For instance, FIGS. 12 and 13, which are discussed in detail later, illustrate positional relationships in a graph rather than a tree. In a graph, positional relationships may include relationships such as "immediate neighbor" or "neighbor at most N steps away". In a directed graph, positions may also reflect link directions, such as "reachable neighbor" or can be reached from in at most N hops".

ACLs and Access Control Properties

Figure 3:
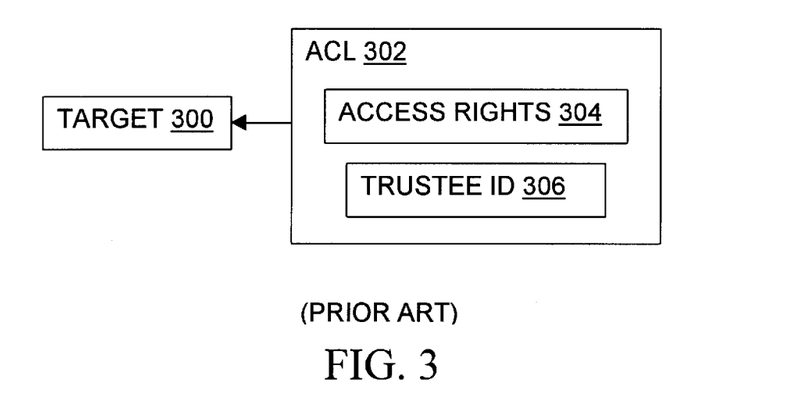
FIG. 3 is a diagram illustrating a prior art access control list ("ACL").

FIG. 3 illustrates a prior art approach to controlling access to objects in a database. A target object 300 has an access control list ("ACL") 302 associated with it. The object 300 and ACL 302 are associated with one another by a pointer, by an index, by storage in a predetermined position relative to the object 300, or by other familiar means for associating two data structures in a computer memory or other computer storage medium.

The ACL includes a rights field 304, and an associated trustee identifier 306. The ACL thus specifies which trustee (s) have which rights to access the target 300. In practice, some implementations allow either or both of the fields 304, 306 to be multi-valued, and many allow zero or more ACLs per target object.

Because the trustee identifier 306 contains a GUID, a distinguished name, or other specific identity of a particular object, the identity of the trustee is specified when field 306 is created or updated. If the trustee moves to a different location but retains the same identifier, then it will still have the specified access rights. If the trustee remains in place relative to the target but the trustee's identifier is changed, then the trustee will not have the specified access rights until the trustee's new identifier is written to field 306. This update might need to be done manually by the administrator, for instance, if the trustee's identifier is changed by movement of a subtree, by database restoration, or by a modification to reflect a change in ownership of the trustee.

Figure 4:
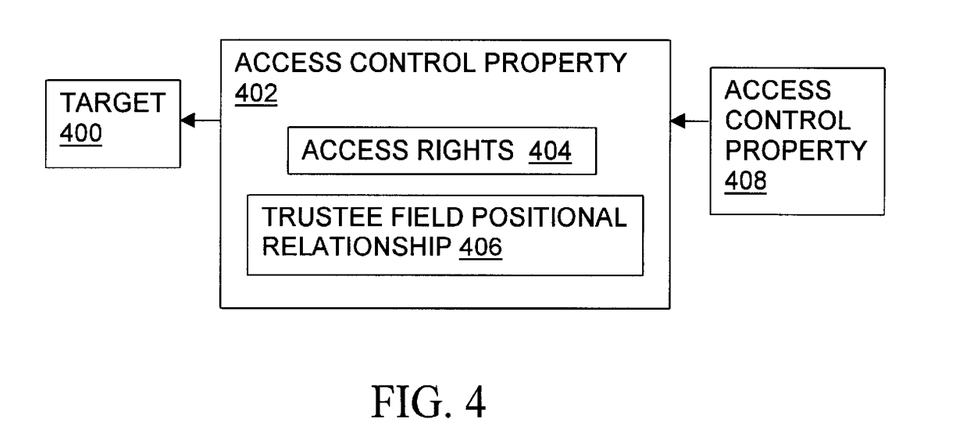
FIG. 4 is a diagram illustrating an access control property according to the present invention.

FIG. 4 illustrates an access control property of the present invention for controlling access to objects in a database. A target object 400 has an associated access control property 402 which contains an access rights field 404 and a trustee field 406. Association means used with ACLs may also be employed to associate access control properties with target objects. The access rights field 404 may be a conventional access rights field such as the field 304 used in ACLs, or it may specify access rights in some other manner familiar in the art.

In the conventional ACL 302, the trustee identifiers are bound to the ACL, through the trustee ID field 306, when the ACL 302 is written. By contrast, binding of trustee identifiers to the access control property 402 is delayed until a request to access the target 400. This delayed evaluation of the trustee field 406 is known as "delayed binding".

Delayed binding according to the invention may be performed in at least two ways. "Access request time" is the time when the access control property 402 is being used to determine whether an access request should be allowed. Given the identity of a target and the identity of a requester at access request time, an embodiment may determine their relationship and then compare it to the positional relationship specified by the access control property 402; if they compare favorably, then the requester is a trustee. Note that favorable comparison does not require equality; the target-requester relationship "parent" satisfies compares favorably to the broader trustee relationship "ancestor".

Alternatively, given the identity of a target and the positional relationship specified by the target's access control property, at access request time an embodiment may locate objects that stand in the required positional relationship to the target; this is the set of all trustees. If the requester is in the set of trustees, then it is a trustee.

The first approach (determining the target-requester relationship and comparing it to the relationship required of trustees) is generally preferable for efficiency reasons. In addition, it is generally simpler not to modify the access control property in response to an access request, so that even if the second approach is used, the set of trustee identities is not necessarily stored in the access control property.

Under the first approach, the trustee field 406 specifies a positional relationship. At access request time, the positional relationship between the requester and the target object 400 is evaluated. If that positional relationship compares favorably with the positional relationship specified by the trustee field 406, then the requirement that the requester be a trustee is satisfied.

Under the second approach, the trustee field 406 initially specifies a positional relationship. The positional relationship (and hence the trustee field 406) is evaluated to obtain one or more specific trustee object identifiers at access request time. If one of these trustee object identifiers identifies the requester, then the requirement that the requester be a trustee is satisfied.

A given positional relationship such as "cousin" can evaluate to different trustee field values for different target objects 400, and even for a given target object 400, depending on the position of other objects relative to the target object 400. If an object that is presently a cousin of the target 400 (and thus would be a trustee) moves to a different location then it will not be a trustee, even if it retains the same identifier. On the other hand, if the trustee remains in place relative to the target but the trustee's identifier is changed, then the trustee will still have the specified access rights.

Some embodiments allow the access rights field 404 and/or the trustee field 406 to be multi-valued, while others do not. A trustee field such as the field 406 may be multi-valued in that it may list a plurality of positional relationships such as "sibling" and "cousin". A trustee field may also be multi-valued in that it may specify a plurality of trustee objects; for instance, several objects may be in the relationship "neighbor" with a given target object. Finally, a trustee field may be multi-valued in that it may specify both a positional relationship and one or more object identifiers obtained by evaluating the positional relationship. For instance, in one embodiment the trustee field 406 might specify the positional relationship "parent" and also identify the parent of the target 400 by holding a copy of the parent's GUID.

In addition to, or in place of, multi-valued fields, some embodiments allow zero or more access control properties to be associated with a given target object. By way of example, FIG. 4 shows a second access control property 408; both of the access control properties 402 and 408 are associated with the same target object 400.

Delayed Binding Methods Generally

Figure 5:
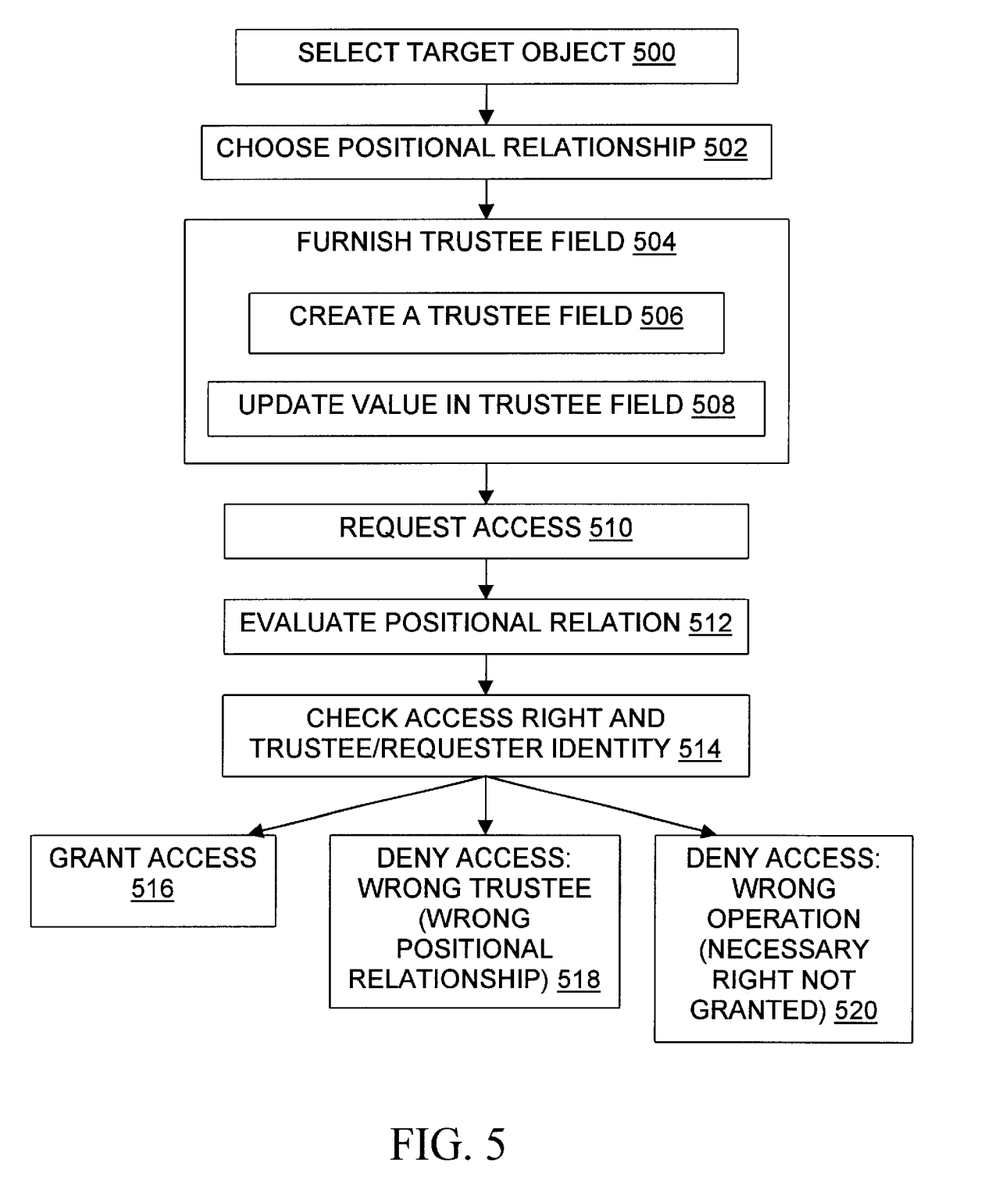
FIG. 5 is a flowchart illustrating access control methods of the present invention.

FIG. 5 illustrates generally methods of the present invention for controlling access to objects using delayed binding. More detailed examples are discussed elsewhere herein, including without limitation in connection with FIG. 10.

During a selecting step 500, at least one target object in the database is chosen. The target object is typically chosen by a network administrator, security manager, or similar person. The basis for choosing the target object varies, but will generally involve a desire to grant a trustee access to the target object so the trustee can perform desired network or database administrative tasks. For illustration, assume the target chosen is the object 400 shown in FIG. 4, and the access control property 402 is associated with the target 400.

During a positional relationship choosing step 502, a positional relationship is chosen. Suitable positional relationships include those that signify hierarchical relationships such as "self", "parent", "sibling", "child", and so on, as discussed in connection with the tree shown in FIG. 2. As noted above, positional relationships may also reflect the relative position of objects in a graph, ring, digraph, net, or other positional structure.

During a furnishing step 504, the trustee field 406 of the access control property is furnished with an indication of the chosen positional relationship. The step of furnishing the trustee field 406 may include creating or updating the trustee field 406, denoted in FIG. 5 by a creating step 506 and an updating step 508, respectively. If no trustee field 406 yet exists, then furnishing it includes creating it with an initial specification of a positional relationship. If the trustee field 406 already exists, then furnishing it includes updating it to specify some desired positional relationship, which might be different from the positional relationship previously specified by the trustee field 406.

During a requesting step 510, a requesting object requests access to the target 400. In response to a similar request in a conventional system, access control software would check the trustee ID 306 in the ACL 302 to determine whether it identified the requester as a trustee of the target 300. If the requester's ID was found in the ACL 302 or in some other ACL associated with the target 300, and the requested type of access was consistent with the corresponding access rights 304, then the access request would be granted; otherwise, it would be denied.

By contrast, the illustrated method requires an evaluating step 512 which evaluates a positional relationship. As noted earlier, this may be done in at least two ways to provide delayed binding according to the invention. The relationship between a requester and the target object 400 may be evaluated to allow subsequent comparison with the relationship specified by the trustee field 406. Alternatively, the trustee field 406 may be evaluated to identify trustee objects and bind their identifiers to the access control property 402 in response to the access request. The bound identifiers will subsequently be checked to see whether the requester is a trustee.

Note that even though the trustee field 406 may be written during the furnishing step 504 and may also be written during the evaluating step 512, the type of information written during each step is different. Positional relationship indicators such as "parent" or "self" are written during the furnishing step 504, while concrete identifiers of particular objects, such as GUIDs, are written during the evaluating step 512.

During a checking step 514, the type of access being sought is compared to the access rights granted by the access rights field 404 in the access control property 402. For instance, if write access is requested and write access is among the rights defined by the access control property 402, then the requested operation is within the scope of the allowed operations. On the other hand, if write access is requested but the access control property 402 shows browsing as the only operation permitted, then the requested operation is outside the scope of the allowed operations.

During the checking step 514, the identity of the requester may also be compared with the identity of the trustee(s). If the first approach to evaluating positional relationships is taken, the checking step 514 includes comparing the target-requester relationship with the relationship in the trustee field furnished during step 504. If the second approach is taken, the checking step 514 includes comparing the requester's identity with the set of trustee identities. In either case, if the requester is not one of the trustees, then the access request will not be granted, even if the requested operation is within the scope of the allowed operations.

Access is granted during a granting step 516 only if the requested operation is allowed by the access control property 402 and the requester is a trustee. If the positional relationship does not evaluate during step 512 in a manner that identifies the requester as a trustee, then access is denied during a denying step 518. Likewise, if the operation sought is not among those allowed by the access control property 402 then access is denied during a denying step 520.

The evaluating step 512 and the access controlling steps 516, 518 can be implemented in various ways. One implementation checks the trustee field 406 to determine which positional relationship is being used, traverses the database around the target object to locate and identify by GUID or other specific identifier all objects in the specified positional relationship, and finally checks that list against the identifier of the requester to see if the requester is one of the trustees. For instance, if the positional relationship is "parent" then this approach identifies all parents (in a tree there is at most one) of the target and then checks to see if the requester is a parent of the target.

Another implementation starts at the requester, inverts the relationship, and then checks to see whether the object at the inverted relationship position is the target. For instance, if the positional relationship is "parent" then this approach inverts it to obtain the relationship "child" and then checks to see if the target is a child of the requester. Those of skill in the art will readily provide other implementations.

Delayed Binding Example

Figure 6:
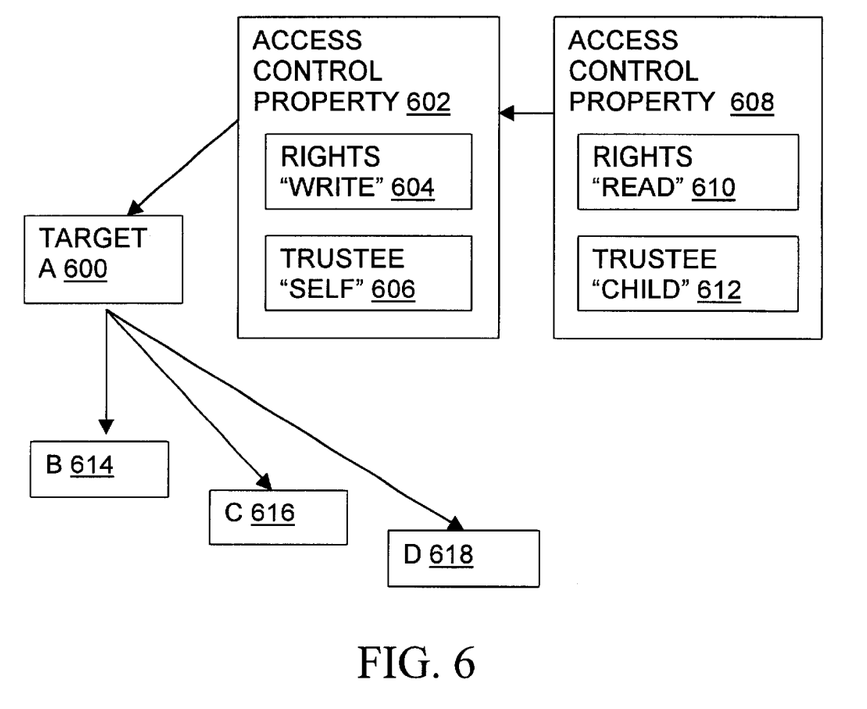
FIG. 6 is a diagram illustrating part of a hierarchical database of objects including access control properties according to the present invention.

FIG. 6 illustrates part of a database according to the invention. A hierarchical tree has a target object 600 at the root position. Object 600 has two associated access control properties 602 and 608. Access control property 602 includes a rights field 604 and a delayed binding trustee field 606, which confer write rights to trustee "self". Access control property 608 includes a rights field 610 and a delayed binding trustee field 612, which confer read rights to trustee "child". The target object 600 has objects 614, 616, and 618 as children.

Assume object 614, which is identified as "B", requests write access to target 600, which is identified as "A". The only trustee identified by trustee field 606 of access control property 602 has the ID "A", which does not match the ID "B" of the requesting object, so B's access request will not be granted on the basis of access control property 602.

Nor will B's request be granted on the basis of access control property 608, because the rights field 610 does not grant anyone write rights, much less grant them to B. In some embodiments which use the second approach to positional relationship evaluation, the trustee field 612 will be evaluated; in others it will not, depending on whether some form of optimization or "short-circuit" evaluation is used. If the trustee field 612 is evaluated, it will include "B" among its values. So B's request will not be granted on the basis of access control property 608, even though B is a trustee, because the operation requested does not match the rights granted.

Delayed Binding and Inheritable Access Constraints

Delayed binding according to the invention may be used in a database which employs inheritable access constraints. As used in the present application, "inheritable access constraint" includes both novel constraints described in the '087 application (such as object class filters and "inheritable" flags for inheritance of an access constraint on a specific object property) and other access constraints propagated by inheritance in a database tree or graph (such as "object rights" or "all properties rights" granted by an inherited access control property or ACL).

Figure 7:
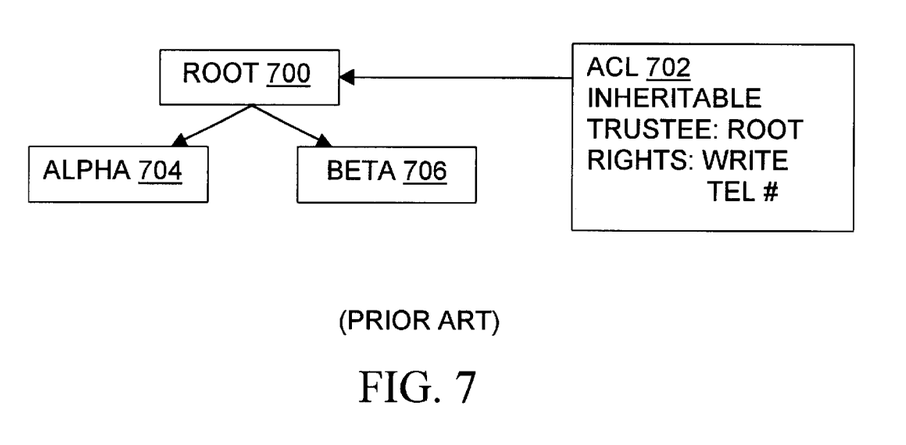
FIG. 7 is a diagram illustrating part of a hierarchical database of objects including a prior art ACL designating a root object as trustee.

FIGS. 7 through 11 illustrate various situations involving inheritance and/or the delayed binding of the present invention. For instance, FIG. 7 shows a database tree having a root object 700 with an ACL 702 and two child objects 704, 706. Although this example has only three objects, those of skill in the art will readily extrapolate to databases with many more objects. The objects 700, 704, 706 and the ACL 702 are configured to take advantage of inheritance of the ACL 702 to make the root 702 a trustee of each child 704, 706 with respect to writing a telephone number attribute of each child 704, 706. The same effect on rights could be provided by attaching a copy of the ACL 702 to each of the children 704, 706, but inheritance is conceptually cleaner in this situation, and requires less ACL storage space. The configuration shown in FIG. 7 is prior art in that it does not involve delayed binding according to the invention.

Figure 8:
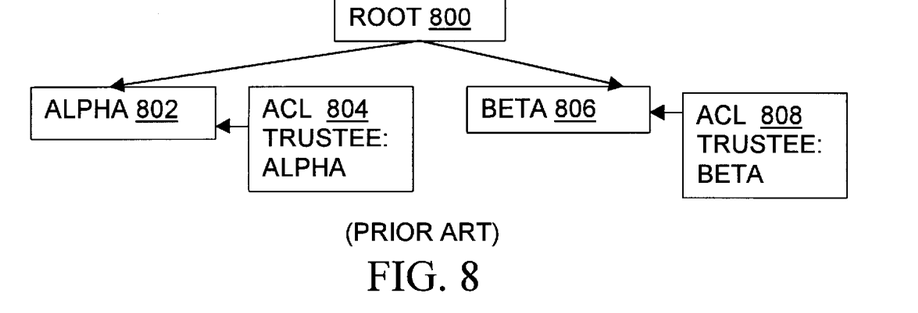
FIG. 8 is a diagram illustrating part of a hierarchical database of objects including two prior art ACLs designating child objects as trustees.

Now assume that instead of giving the root object the right to change the telephone number in each of its user objects, we wish to give each user object the right to change its own phone number. Without delayed binding, this is done by placing a different ACL on each user object, as shown in FIG. 8. Object 802 is identified as "Alpha" and has an ACL 804, and object 806 is identified as "Beta" and has a separate ACL 808. Each ACL 804, 808 gives the corresponding object 802, 806, respectively, the access right to change its own phone number attribute value. For large databases, providing and maintaining distinct ACLs in this manner may become a serious administrative burden.

Figure 9:
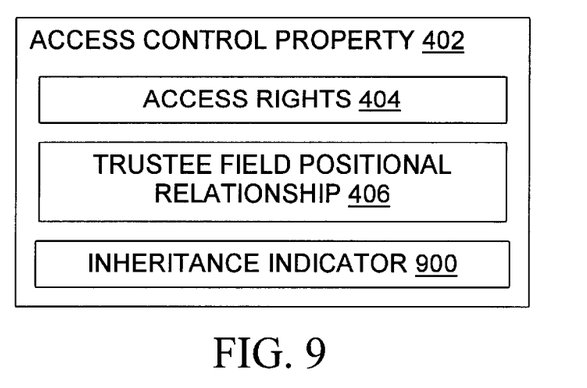
FIG. 9 is a diagram illustrating a signal embodiment of an inheritable access control property according to the present invention.

Accordingly, some embodiments of the present invention combine inheritance with delayed binding to reduce administrative burdens and/or provide other benefits. Toward that end, FIG. 9 shows an access control property 402 embodiment which includes an inheritance indicator 900. The inheritance indicator 900 may be implemented using a flag, a predefined constant, or another indication. Suitable indicators and means for performing inheritance by propagation of access constraints or rights may be provided by those of skill in the art in a manner analogous to conventional inheritance involving "object rights" or "all properties rights", in a manner analogous to novel inheritance of the type claimed in the '087 application, or through other means.

Figure 10:
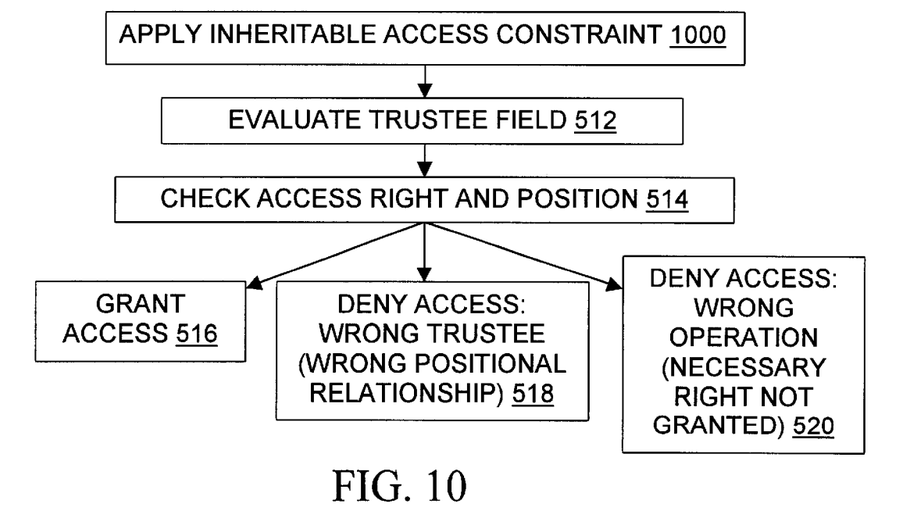
FIG. 10 is a flowchart illustrating a variation on the methods shown in FIG. 5, for use with one or more inheritable access control properties of the present invention.

FIG. 10 illustrates a method of the invention involving both inheritance and delayed binding. During an applying step 1000, the inheritable access constraint specified by an access control property such as the property shown in FIG. 9 is applied. That is, the access constraint is propagated, through inheritance, from the target object associated with the access control property to the target's descendants. This may be done in response to a request to access a descendant of the root object to which the access control property 402 is attached, or it may be done before such a request is made. Propagation may be implemented by making access control property copies, or by referencing a particular target object of interest in combination with the original access control property.

During the evaluating step 512, one or more positional relationships are evaluated with respect to the target object to which access is sought. Because inheritance was previously performed during step 1000, the target object need not have been the root object, that is, the object to which the inherited access control property 402 was attached before step 1000. As a result, inheritance and delayed binding can be used to give each object in a tree the ability rights as its own trustee.

Figure 11:
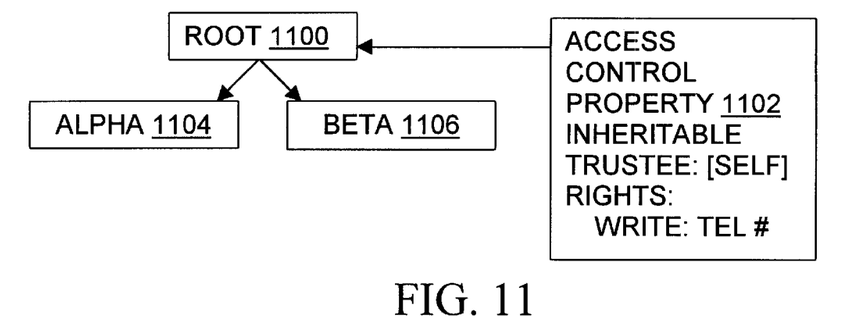
FIG. 11 is a diagram illustrating part of a hierarchical database of objects including two inheritable access control property instances of the present invention which designate child objects as trustees.

FIG. 11 shows an example use of inheritance and delayed binding in a small tree. A root object 1100 has an inheritable access control property 1102 of the kind shown in FIG. 9. The access control property 1102 contains an access rights field 404 which grants rights to modify a telephone number attribute, and a trustee field 406 specifying the positional relationship "self". The access control property 1102 also contains an inheritance indicator 900 which marks the access control property 1102 as inheritable.

If the access control property 1102 is propagated to child objects 1104, 1106 during the step 1000 and then the trustee fields of the inherited access control property instances are evaluated during step 512, then the instance attached to object 1104 (Alpha) will grant that object the right to modify its own telephone number attribute and the instance attached to object 1106 (Beta) will grant it the right to modify its telephone number attribute.

Alternatively, the evaluating step 512 may be performed prior to the inheriting step 1000, in which case the instances would grant telephone number modification rights only to the root; this would be analogous in effect (though not in mechanism) to the result shown in FIG. 7. More generally, even though FIGS. 5 and 10 show steps being performed in particular orders the steps may also be performed in other orders or concurrently, except when one step requires the result of another step. Steps may also be repeated, named differently, or omitted unless expressly or implicitly called for in a claim.

In either case, the checking step 514 and the granting or denying steps 516 through 520 are performed as needed. If the operation requested and the requesting object ID match the access control property rights 404 and trustee 406, then access is granted. Otherwise, access is denied.

Although the discussion up to this point has focused on the positional relationship evaluating to a value that makes sense within the context of a hierarchical database, such as the relationship "child", in alternative embodiments positional relationships can also be evaluated to values that make sense in other configurations, such directed graphs and undirected graphs.

Positional Relations Outside Trees

Graphs in general, and directed graphs in particular, are well known in the computer science and programming arts.

Figure 12:
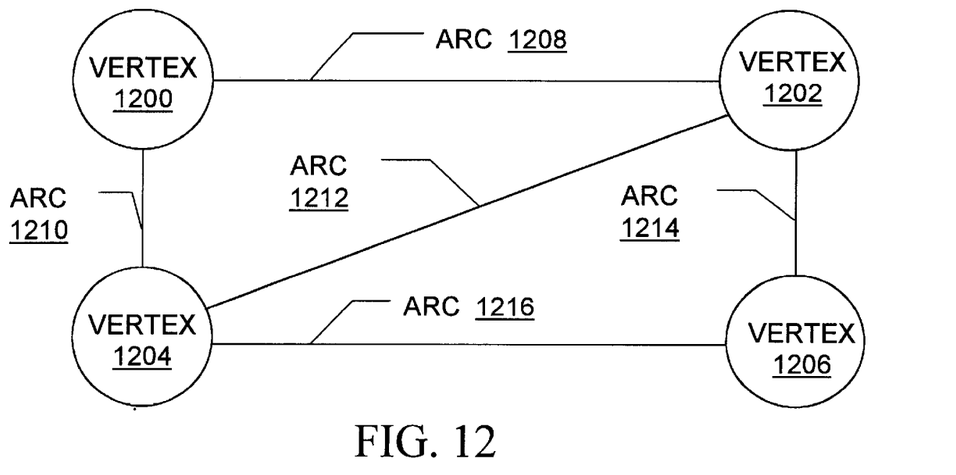
FIG. 12 is a diagram illustrating part of a graph-structured database having objects at its vertices, with access to the objects being controlled through use of access control properties according to the present invention.
Figure 13:
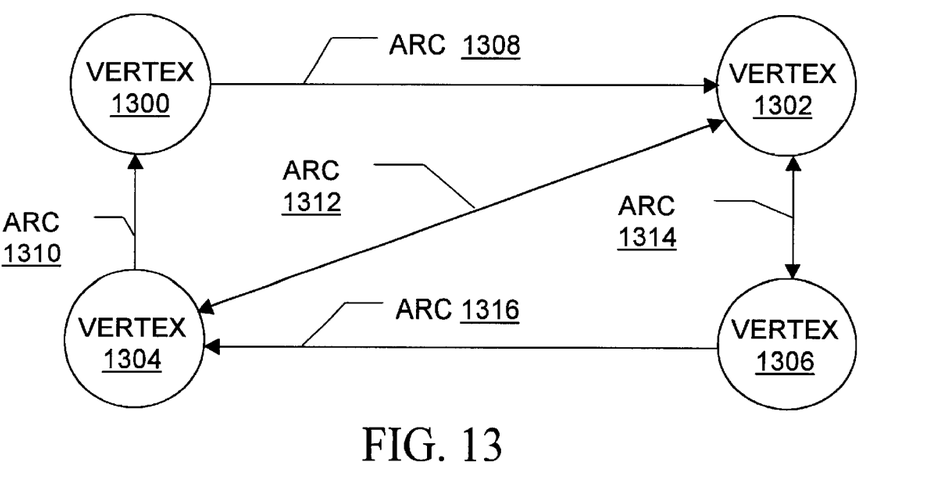
FIG. 13 is a diagram illustrating part of a directed-graph-structured database having objects at its vertices, with access to the objects being controlled through use of access control properties according to the present invention.

Some of the positional relations used with undirected graphs and/or directed graphs can be employed according to the present invention; a few of the many possible examples are shown in FIGS. 12 and 13.

As shown in these two Figures, each graph includes one or more "vertices" (also known as "nodes" or "points" or "locations") connected with zero or more "arcs" (sometimes "edges" or "links" or "segments"). A directed graph is a graph in which arcs may have a direction, as indicated by the arrowheads in FIG. 13. Vertices separated by exactly one edge are adjacent. For instance, vertex 1200 and vertex 1202 are adjacent, while vertex 1200 and vertex 1206 are not adjacent. In directed graphs, direction may be made part of the definition of adjacency, so that vertex 1300 is adjacent to vertex 1304 but vertex 1304 is not adjacent to vertex 1300, for example. Those of skill in the art will recognize that other terminology is also used with graphs to discuss concepts such as connectivity, distance in hops, spanning, and so on.

An access control property according to the invention may use trustee fields and delayed binding with graph positional relationships as well as with tree positional relationships. As a few of the many possible examples, positional relationships in a graph might include "adjacent node" or "connected node" to specify that a trustee must be adjacent to the target, or in the same connected portion of the graph, respectively.

Directed arcs, traversal algorithms (breadth-first, or depth-first, for instance), or some combination thereof permit propagation of the access control property by graph nodes through inheritance, delayed binding and inheritance can also be employed in combination to control access to objects serving as (or attached to) graph nodes, in a manner analogous to the use of delayed binding and inheritance to control access to objects arranged in trees.

More on Systems

Figure 14:
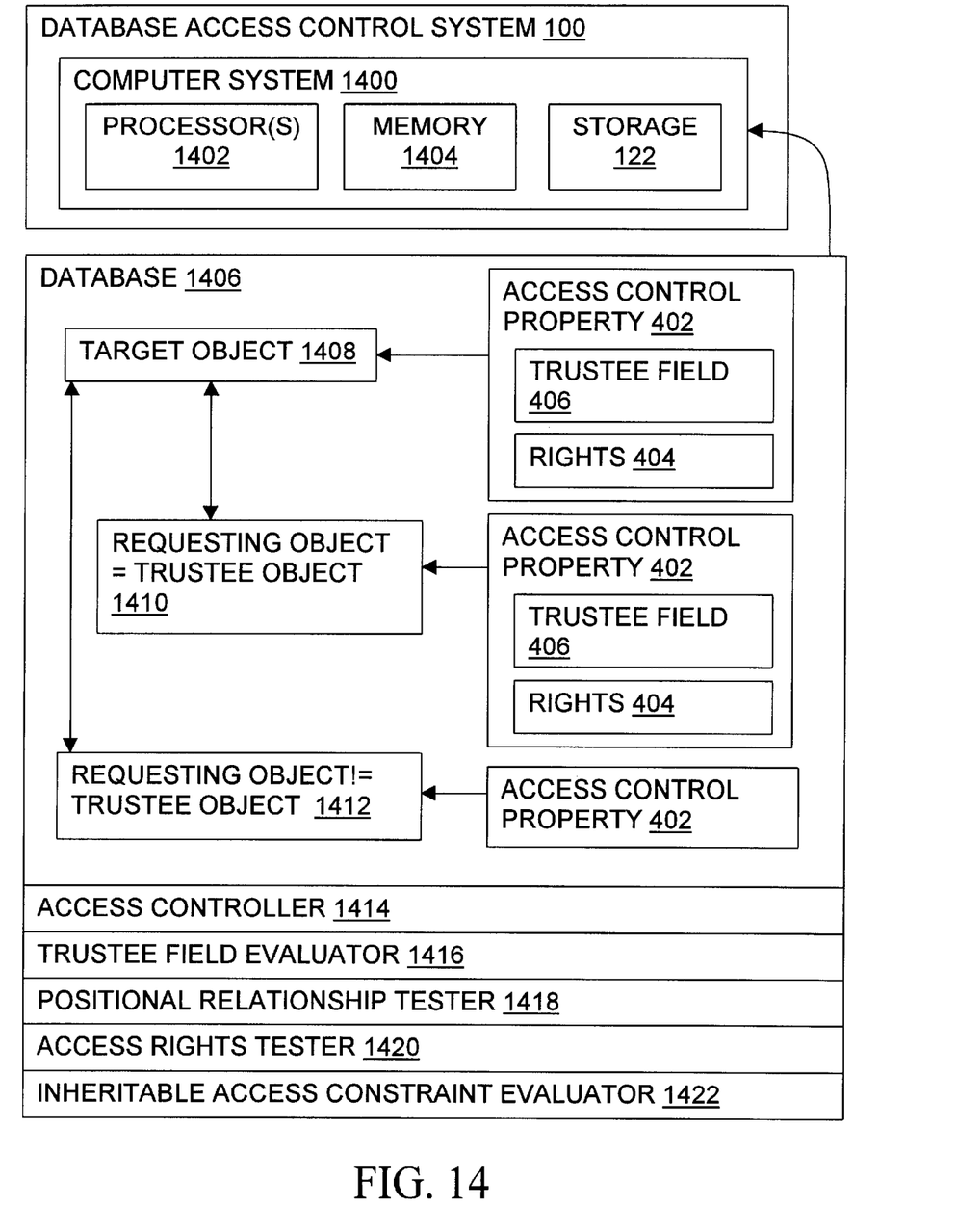
FIG. 14 is a diagram further illustrating the system shown in FIG. 1.

The methods, structures, and signals discussed above can be used or embodied in a variety of systems, including the particular system 100 which shown in FIG. 1 and further illustrated further in FIG. 14. The system 100 includes at least one computer 1400 which may include one or more of the various computers identified above in connection with FIG. 1 or another type of computer. The computer 1400 includes at least one processor 1402 and memory 1404. The memory 1404 may include both volatile memory such as RAM and non-volatile memory such as disks or tape or disk arrays 120.

A database 1406 is stored in the memory 1404. The database 1406 may be a directory services depository, a hierarchical database, a synchronized-partition database, an object-oriented-relational-hybrid database, a collection of objects arranged in a graph or a directed graph or a tree, or some combination of such databases.

As suggested by the method steps shown in FIGS. 5 and 10 and for purposes of illustration, the database 1406 includes a target object 1408, a requesting object 1410 which is a trustee object, and a requesting object 1412 which is not a trustee. Illustrative access control properties 402 are attached to (or stored adjacent to or point to or are otherwise associated with) the various objects. Of course, a production database would likely contain many more objects (with their attributes) and access control properties.

The system 100 also includes an access controller 1414, which coordinates activities by several other software modules 1416 through 1420 (or 1422 in some embodiments) to control access in the manner described herein. The access controller is shown in FIG. 14 as a separate module, but those of skill in the programming arts will recognize that the access controller could also contain the modules 1416 through 1420 or 1422. If a requesting object is a trustee and has the proper access right for the requested operation, the access controller 1414 grants the request; otherwise, the controller 1414 denies access.

The components coordinated by the controller 1414 include a trustee field evaluator 1416 which evaluates the positional relationship stored in the trustee field 406; a positional relationship tester 1418 which determines whether a requesting object is in the required positional relationship with the target object; and an access rights tester 1420 which determines if the access operation requested by a requesting object is consistent with rights 404 granted by the access control property 402. In some embodiments the positional relationship tester 1418 determines whether a requesting object is in the relationship required of trustees by determining the relationship between the target and the requester and checking to see whether that relationship compares favorably with the required relationship. In other embodiments, the tester 1418 compares the requesting object ID to IDs in an evaluated trustee field 406. In some embodiments an inheritable access constraint 1422 performs inheritance by propagating the effect of access control properties as discussed in connection with FIGS. 9 through 11, for example.

Suitable software and/or hardware implementations of these components 1414 through 1422 according to the invention are readily provided by those of skill in the art using the teachings presented here and programming languages and tools such as Java, Pascal, C++, C, Perl, shell scripts, assembly, firmware, microcode, logic arrays, PALs, ASICs, PROMS, and/or other languages, circuits, or tools.

As an example in the context of FIG. 14, assume the trustee field 406 in the access control property 402 attached to the target object 1408 contains the positional relationship "self", the corresponding access right 404 is "read", and the requesting object 1412 is a child of the target object 1408 requesting "read" access to the target 1408. The access controller 1414 will deny the request, based on determinations and actions by the coordinated components. The access rights tester 1420 will determine that the access right being requested is the same as the access right allowed; the trustee field evaluator 1416 will evaluate the trustee field "self" to the target 1408 ID; the positional relationship tester 1418 will then check the ID of the requesting object 1412 and determine that it is not an ID in the trustee field. Because the requester 1412 is a not a trustee in this situation, access will be denied.

As another example, assume the target object 1408 has an associated inheritable access control property 402 with the trustee field 406 set to "self" and the access rights 404 set to "write" for all object properties. If the target object 1408 is the root of a hierarchical database subtree, then all objects in the subtree have been granted the right to change (write) their own properties through the addition of a single access control property.

Summary

In summary, the present invention provides novel system, signals, devices, and methods for controlling access to objects in a database. Instead of binding the ID of a specific trustee object to a target object when the access rights are specified, the invention stores a positional relationship which is evaluated only as needed. Delayed binding of trustee IDs allows the identity of a trustee object to be determined when access is requested; conventional ACLs may be used in the database when delayed binding is not needed. Delayed binding may also be combined with inheritance. The invention promotes higher-level organization of the access control by hiding details, just as programming languages increase their power by hiding details. The ability to use one (or a few) access control properties instead of many ACLs can greatly reduce the workload required to maintain the database, as well as the chances for error.

Although particular methods (FIGS. 5, 10) and signal formats (FIGS. 4 and 9) embodying the present invention are expressly illustrated and described herein, it will be appreciated that apparatus and article embodiments may be formed according to the signals and methods of the present invention. Unless otherwise expressly indicted, the description herein of methods and signals of the present invention therefore extends to corresponding apparatus and articles, and the description of apparatus and articles of the present invention extends likewise to corresponding methods and signals.

The invention may be embodied in other specific forms without departing from its essential characteristics, including object databases which are only partially hierarchical, and object databases structured as undirected graphs or directed graphs. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for controlling access to objects in a database, the computer-implemented method comprising the steps of:
   choosing a positional relationship in reference to a target object in the database; and
   furnishing a trustee field with the positional relationship in an access control property associated with the target object.

2. The method of claim 1, further comprising the steps of evaluating a positional relationship between the target object and a requester object in the database to obtain a target-requester relationship; and determining whether that target-requester relationship compares favorably with the chosen positional relationship.

3. The method of claim 2, further comprising the step of granting the trustee object access to the target object.

4. The method of claim 2, further comprising the step of denying a request by a requesting object to access the target object when the target-requester relationship does not compare favorably with the chosen positional relationship.

5. The method of claim 1, further comprising the step of evaluating the trustee field to identify a trustee object which is in the chosen positional relationship with the target object.

6. The method of claim 1, wherein the access control property specifies an access right, further comprising the step of denying an access request by a requesting object to access the target object when the access requested is not allowed by the access right specified in the access control property.

7. The method of claim 1, wherein the database is a hierarchical tree-structured database and the access control property specifies an inheritable access constraint.

8. The method of claim 7, further comprising the steps of applying the inheritable access constraint through inheritance and then evaluating a positional relationship to determine whether a requester is a trustee.

9. The method of claim 8, further comprising the step of granting a trustee object access to the target object.

10. The method of claim 8, further comprising the step of denying a request by a requesting object to access the target object when the trustee field does not identify the requesting object.

11. The method of claim 8, wherein the access control property specifies an access right, further comprising the step of denying an access request by a requesting object to access the target object when the access requested is not allowed by the access right specified in the access control property.

12. The method of claim 1, wherein the database is a graph-structured database and the access control property specifies an inheritable access constraint to be propagated between vertices of the graph.

13. The method of claim 1, wherein the step of furnishing a trustee field includes obtaining a storage location for the trustee field and storing an initial positional relationship value in the trustee field.

14. The method of claim 1, wherein the step of furnishing a trustee field includes overwriting a positional relationship value previously stored in the trustee field.

15. The method of claim 1, wherein the chosen positional relationship is a hierarchical relationship comprising at least one relationship from the group of relationships containing "child" and "parent" relationships.

16. The method of claim 1, wherein the chosen positional relationship is a graph relationship comprising at least one relationship from the group of relationships containing "adjacent" and "connected to" relationships.

17. The method of claim 1, wherein the chosen positional relationship is a directed graph relationship comprising at least one relationship from the group of relationships containing "adjacent" and "reachable from" relationships.

18. A database access control system comprising:
   a computer system having a memory and a processor;
   a database stored in the memory and susceptible to processing with the processor, the database including a target object, the target object having an access control property furnished with a trustee field to hold at least one positional relationship; and
   an access controller which grants or denies requests for access to the target object.

19. The system of claim 18, wherein the access controller comprises a trustee field evaluator which evaluates the trustee field to identify a trustee object which is in a positional relationship with the target object.

20. The system of claim 18, wherein the access controller comprises a positional relationship tester which determines if a requesting object is in the positional relationship with the target object.

21. The system of claim 18, wherein the access controller comprises an access rights tester.

22. The system of claim 18, wherein the access controller comprises an inheritable access constraint evaluator and the system comprises an inheritance propagator for propagating inheritable access control properties.

23. The system of claim 18, wherein database comprises objects arranged in a tree structure.

24. The system of claim 18, wherein database comprises objects arranged in a graph structure.

25. The system of claim 24, wherein database comprises objects arranged in a directed graph structure.

26. The system of claim 18, wherein database comprises replicated partitions.

27. The system of claim 18, wherein database comprises a directory services database.

28. The system of claim 18, wherein the database comprises tables defining relations.

29. A data signal embodied in a computer readable medium, the signal comprising an access rights field of an access control property and a trustee field specifying a positional relationship relative to at least one target object in a database.

30. The data signal of claim 29, further comprising an inheritance indicator.

31. A computer storage medium having a configuration that represents data and instructions which will cause performance of method steps for controlling access to objects and their attributes in a database, the method comprising the steps of:

choosing a positional relationship in reference a target object in the database; and furnishing a trustee field with the positional relationship in an access control property associated with the target object.

32. The configured storage medium of claim 31, wherein the method further comprises the step of determining whether a requesting object is in the chosen positional relationship with the target object.

33. The configured storage medium of claim 32, wherein the method further comprises the step of denying a request by the requesting object to access the target object when the requesting object is not in the chosen positional relationship with the target object.

34. The configured storage medium of claim 32, wherein the access control property specifies an access right and the method further comprises the step of denying a request by a requesting object to access the target object when the access sought by the requesting object is not allowed by the access right specified in the access control property.

35. The configured storage medium of claim 31, wherein the method further comprises the step of applying an inheritable access constraint through inheritance.

* * * * *